(12) United States Patent
Kuhn

(10) Patent No.: US 11,137,009 B2
(45) Date of Patent: Oct. 5, 2021

(54) ANCHOR ROD FOR A CHEMICAL ANCHOR SYSTEM

(71) Applicant: HILTI AKTIENGESELLSCHAFT, Schaan (LI)

(72) Inventor: Martin Kuhn, Germering (DE)

(73) Assignee: Hilti Aktiengesellschaft, Schaan (LI)

( * ) Notice: Subject to any disclaimer, the term of this patent is extended or adjusted under 35 U.S.C. 154(b) by 342 days.

(21) Appl. No.: 16/311,023

(22) PCT Filed: Jul. 11, 2017

(86) PCT No.: PCT/EP2017/067375
§ 371 (c)(1),
(2) Date: Dec. 18, 2018

(87) PCT Pub. No.: WO2018/015209
PCT Pub. Date: Jan. 25, 2018

(65) Prior Publication Data
US 2020/0217343 A1    Jul. 9, 2020

(30) Foreign Application Priority Data
Jul. 18, 2016    (EP) .................................... 16179858

(51) Int. Cl.
*F16B 13/00*    (2006.01)
*F16B 13/14*    (2006.01)

(52) U.S. Cl.
CPC ...... *F16B 13/141* (2013.01); *F16B 2013/148* (2013.01)

(58) Field of Classification Search
CPC ................. F16B 13/141; F16B 13/143; F16B 2013/148; F16B 33/06; F16B 35/007

USPC .................................................. 411/82, 82.3
See application file for complete search history.

(56) References Cited

U.S. PATENT DOCUMENTS

| 3,379,016 A * | 4/1968 | Williams ............. F16B 13/141 405/259.5 |
| 4,211,049 A * | 7/1980 | Fischer ................ F16B 13/141 52/704 |
| 4,214,416 A * | 7/1980 | Fischer ................ F16B 13/141 52/704 |

(Continued)

FOREIGN PATENT DOCUMENTS

| CN | 1174943 | 3/1998 |
| CN | 102953744 | 3/2013 |

(Continued)

OTHER PUBLICATIONS

International Search Report dated Oct. 5, 2017 in PCT/EP2017/067375.
Written Opinion dated Oct. 5, 2017 in PCT/EP2017/067374.

*Primary Examiner* — Flemming Saether
(74) *Attorney, Agent, or Firm* — Grüneberg and Myers PLLC

(57) ABSTRACT

The invention relates to an anchor rod (10) for a chemical anchor system for use in a bore hole filled with mortar mass, which anchor rod has an anchoring region (12), which comprises the front end (16) of the anchor rod (10), and a connecting region (14), which has a thread (24) and, at the front end of the connecting region, a transition region (28), wherein the thread (24) is provided at least partially in the transition region (28) and is sealed with a coating (30) in the transition region (28).

12 Claims, 2 Drawing Sheets

(56) References Cited

U.S. PATENT DOCUMENTS

| | | | | |
|---|---|---|---|---|
| 4,642,964 | A * | 2/1987 | Kellison | E04B 1/4121 |
| | | | | 52/699 |
| 4,856,954 | A * | 8/1989 | Peterson | B05D 1/322 |
| | | | | 411/427 |
| 6,185,886 | B1 * | 2/2001 | Gruen | E02D 5/80 |
| | | | | 52/223.13 |
| 6,240,696 | B1 | 6/2001 | Ludwig et al. | |
| 7,802,951 | B2 * | 9/2010 | Houck | F16B 35/041 |
| | | | | 411/82 |
| 8,485,758 | B2 * | 7/2013 | Cai | E21D 21/0033 |
| | | | | 405/259.5 |
| 8,517,641 | B2 * | 8/2013 | Dubon | F16B 13/144 |
| | | | | 405/259.6 |
| 9,464,524 | B2 | 10/2016 | Glogger et al. | |
| 2008/0080945 | A1 | 4/2008 | Bee et al. | |
| 2011/0083396 | A1 * | 4/2011 | Shelton | F16B 15/00 |
| | | | | 52/698 |
| 2012/0282058 | A1 | 11/2012 | Glogger | |
| 2014/0363239 | A1 | 12/2014 | Glogger et al. | |

FOREIGN PATENT DOCUMENTS

| | | |
|---|---|---|
| DE | 41 08 500 | 9/1991 |
| EP | 2 518 337 | 10/2012 |
| GB | 2 241 998 | 9/1991 |
| GB | 2518463 | 3/2015 |
| JP | 2000-46029 | 2/2000 |
| JP | 2015-501403 | 1/2015 |

\* cited by examiner

ANCHOR ROD FOR A CHEMICAL ANCHOR SYSTEM

This application is a National Stage entry under § 371 of International Application No. PCT/EP2017/067375, filed on Jul. 11, 2017, and which claims the benefit of European Application No. 16179858.2, filed on Jul. 18, 2016, the entire contents of which are hereby incorporated by reference.

FIELD OF THE INVENTION

The invention relates to an anchor rod for an expanding chemical anchor system for use in a borehole filled with mortar compound.

BACKGROUND OF THE INVENTION

Expanding chemical anchor systems consist of a special anchor rod and an associated mortar cartridge. The mortar cartridge consists of an envelope, in which a predetermined quantity of mortar compound is enclosed.

To fasten the anchor rod in a borehole that has been made in a carrier, such as concrete, the mortar cartridge is first introduced into the borehole and the anchor rod is subsequently screwed into the borehole equipped in this way with mortar compound. While the anchor rod is being screwed in, the envelope of the mortar cartridge is destroyed and the mortar compound is mixed. Thereupon the mortar compound spreads out in the borehole and along the anchor rod, until ultimately the entire borehole is filled with mortar compound and thus also the part of the anchor rod that had been introduced into the borehole is completely surrounded by mortar compound.

In another constructional form, expanding chemical anchor systems consist of a special anchor rod and a curing grout/chemical mortar. This is introduced in the uncured state into the borehole and the anchor rod is forced in.

For both constructional forms of these anchors, it is necessary, after completion of curing, to separate the anchor rod itself from the chemical mortar, so that these can be shifted in axial direction relative to one another. The active separation of the anchor rod from the chemical mortar or the loosening of the anchor rod from the mortar shell is also known as activation of the anchor rod. If this activation does not take place, the full load level cannot be attained, because expansion is incomplete.

The described anchor rods usually have an anchoring region, which is introduced into the borehole and surrounded by the mortar compound, and a connecting region, on which the load to be carried is fastened. Usually the connecting region has a thread for fastening.

For anchor rods that permit a variable setting depth, i.e. that can be fastened at different depths in the carrier, it may occur that the anchor rod is introduced so far into the borehole that threaded portions of the connecting region are also located in the borehole. Once curing is complete, these prevent what is known as activation of the cones of the expanding element.

SUMMARY OF THE INVENTION

It is therefore the object of the invention to provide an anchor rod and a fastening arrangement in which easy activation of the cones of the anchor rod is possible even at maximum setting depth.

The object is solved on the one hand by an anchor rod for a chemical anchor system for use in a borehole filled with mortar compound, having an anchoring region that comprises the front end of the anchor rod and a connecting region that has a thread and is provided at its front end with a transition region, wherein the thread is provided at least partly in the transition region and is sealed with a coating in the transition region. The invention is based on the underlying idea of permitting activation of the anchor rod at any time and, in particular, even when the anchor rod has been set so deep that the thread is located partly within the mortar compound. For this purpose, the thread is sealed with the coating, meaning that the thread flights of the thread are evened out or covered by the coating in such a way that no mortar compound is able to penetrate into the thread turns. This prevents the mortar compound from curing in the thread flights, whereby the mortar compound would mesh with the anchor rod. Due to the coating, meshing between mortar compound and anchor rod is safely prevented, and so (almost) no loads can be transmitted from the thread to the cured mortar compound.

Preferably, the coating is formed in such a way that it continuously uncovers the thread when a female thread complementary to the thread is screwed along coated portions of the thread, whereby the function of the thread becomes available along its full length when the thread is not intended to be introduced into the borehole, so that a nut or the like may be screwed on along the entire connecting portion.

In one embodiment of the invention, the thread with the coating in the transition region has an outer contour that in axial direction does not generate any pull-out resistance, in order to permit activation of the anchor rod. Preferably, the outer contour is a cylindrical outer contour, since hereby the introduction of the anchor rod into the borehole is further simplified.

In one configuration of the invention, the transition region begins at a distance to the front end of the anchor rod that corresponds to the minimum setting depth of the anchor rod and the transition region extends away from the front end. This ensures that the thread is able to extend as far as the borehole opening even if the anchor rod is inserted to minimum setting depth. Minimum setting depth in this context means the minimum permissible setting depth of the chemical anchor system.

For example, the material of the coating is chosen such that thereby it may be partly removed in portions from the thread flight of the thread to allow a female thread complementary to the thread to be screwed onto the corresponding portion of the thread, so that the coating is pressed at least partly out of the thread flight.

Preferably, the material is a wax, whereby the coating can be made inexpensively. In particular, the wax may be environmentally compatible and rapidly degradable, so that no environmental harm is caused when the chemical anchor system is used outdoors.

Further features and advantages of the invention will become apparent from the description hereinafter as well as from the attached drawings, to which reference is made. In the drawings.

Figure 1:
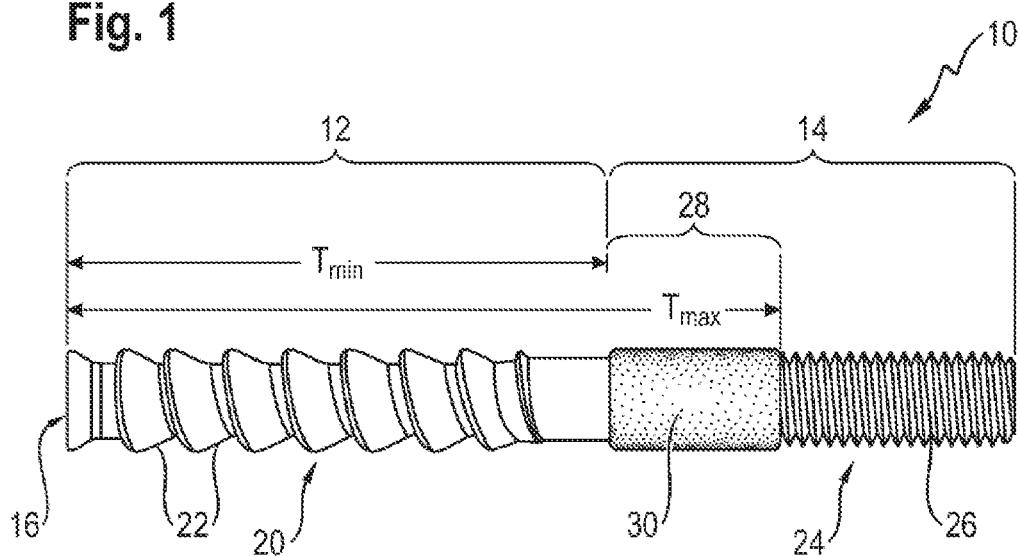
FIG. 1 shows an inventive anchor rod in a side view.
Figure 3:
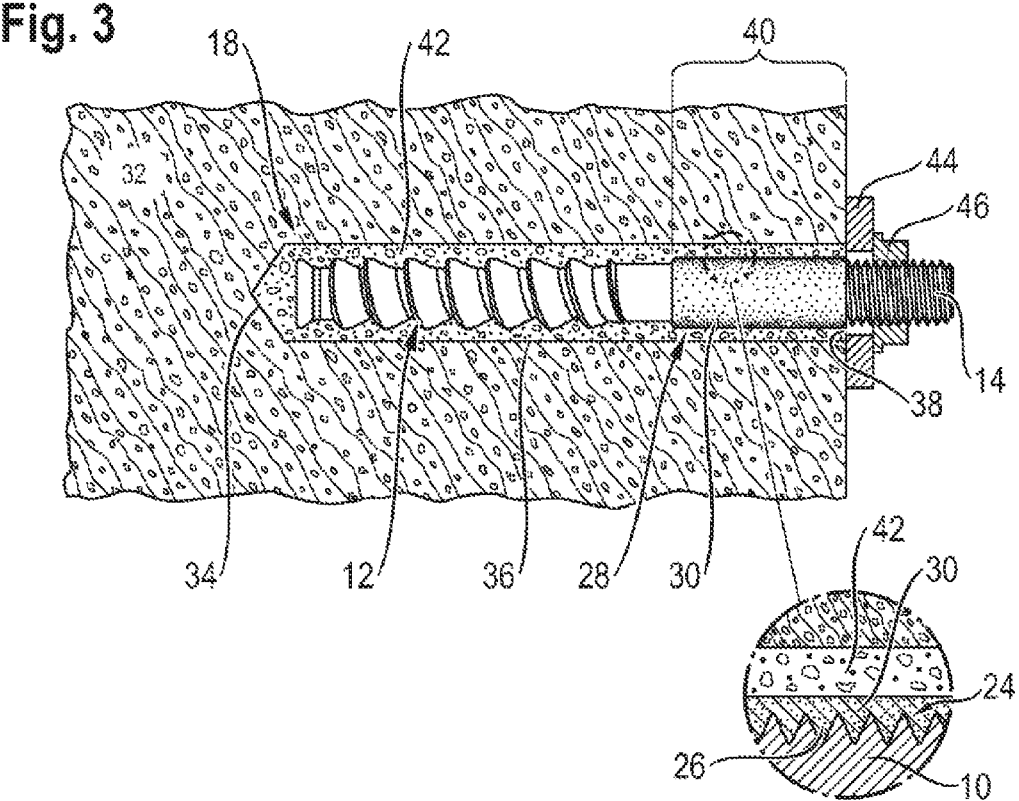
Figure 4:
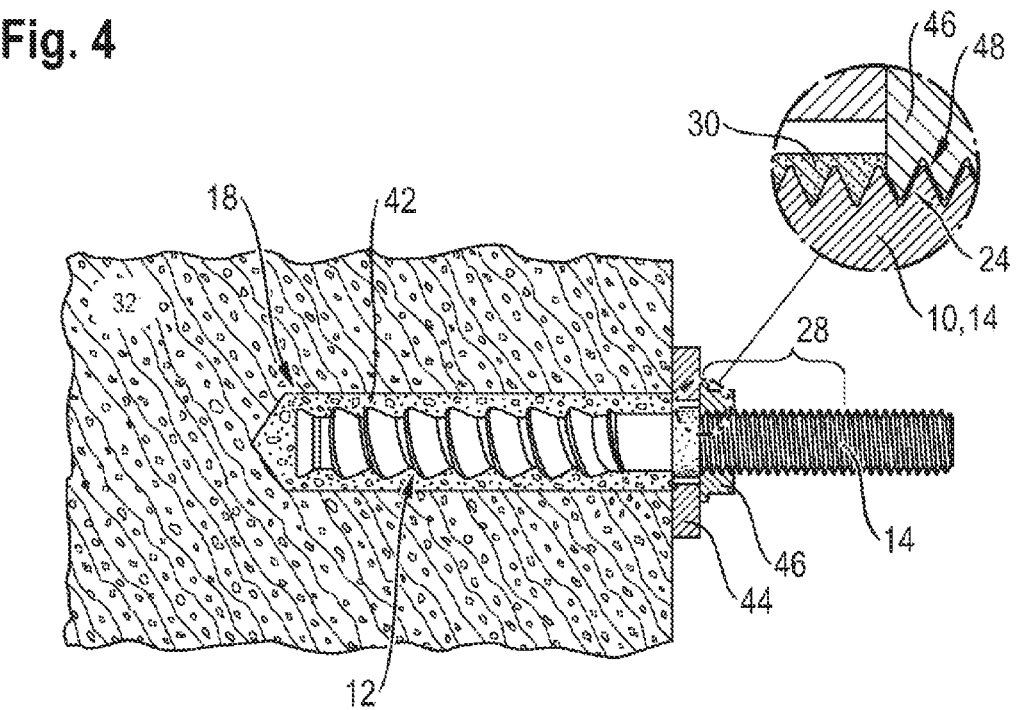

FIG. 3 schematically shows the anchor rod according to FIG. 1 in a state inserted to maximum setting depth in a borehole, and FIG. 4 schematically shows the anchor rod according to FIG. 1 in a state inserted to minimum setting depth in a borehole.

DETAILED DESCRIPTION

Figure 2:
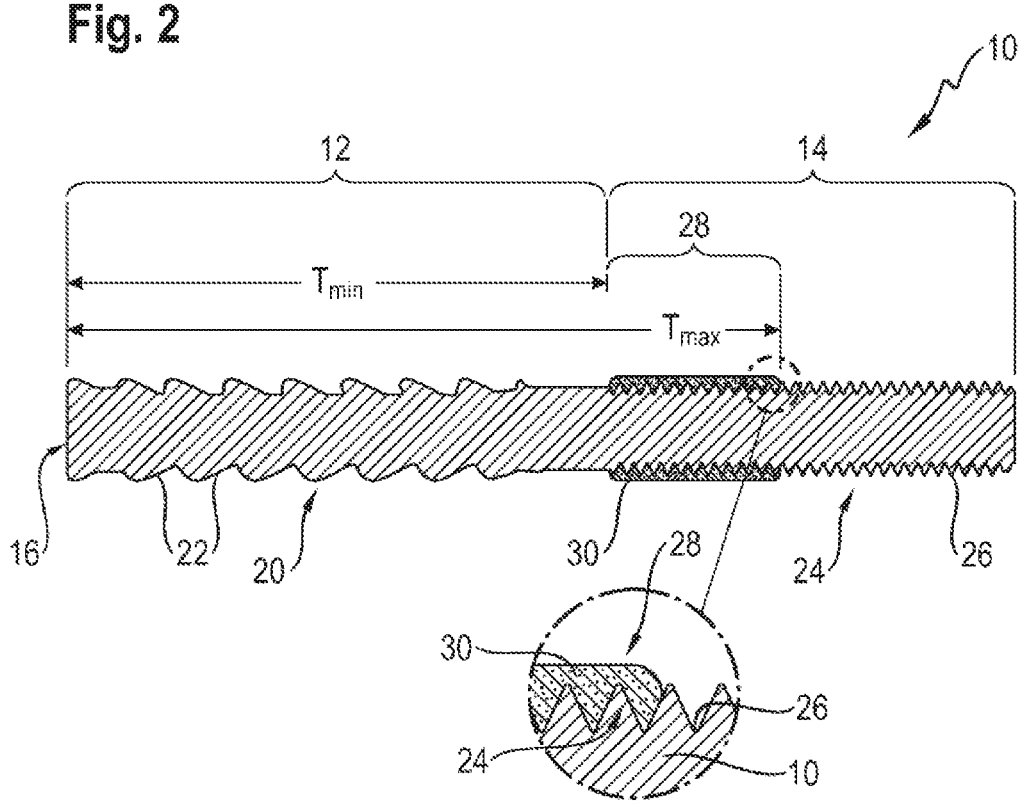
FIG. 2 shows a schematic sectional view of the anchor rod according to FIG. 1.

FIGS. 1 and 2 illustrate an anchor rod 10 for a chemical anchor system with an anchoring region 12 and a connecting region 14.

Anchoring region 12 comprises front end 16 of anchor rod 10, meaning that the end of anchor rod 10 is first introduced together with anchor rod 10 into a borehole 18 (see FIG. 3). Anchoring region 12 extends up to connecting region 14, which adjoins anchoring region 12.

As in the embodiment shown, a fastening thread 20 is formed in anchoring region 12. In a side view, fastening thread 20 has conical portions 22, which are axially aligned in such a way that they broaden toward front end 16.

A thread 24, with which loads can be fastened onto anchor rod 10, is formed on connecting region 14. In the embodiment shown, thread 24 extends along the entire connecting region 14.

Thread 24 has a thread flight 26, as can be seen in the enlargement of FIG. 2.

Connection region 14 is spaced from front end 16 of the anchor rod 10 at a distance to that corresponds to the minimum setting depth $T_{min}$ of anchor rod 10.

In addition, connecting region 14 has a transition region 28, which extends from the front end of connecting region 14 to another point of connecting region 14. As an example, transition region 28 ends at a distance from front end 16 that corresponds to the maximum setting depth $T_{max}$ of anchor rod 10.

In other words, transition region 28 extends in a portion of connecting region 14 between the minimum setting depth $T_{min}$ and the maximum setting depth $T_{max}$ as viewed from front end 16 of the anchor rod.

The values of the minimum setting depth $T_{min}$ and of the maximum setting depth $T_{max}$ then correspond to the setting depth that is permissible for the chemical anchor system of anchor rod 10.

Thread 24 extends along the entire transition region 28. In transition region 28, thread 24 is sealed by a coating 30. For this purpose, thread flight 26 of thread 24 is filled completely by the material of coating 30. In the embodiment shown the material of coating 30 is a wax.

This wax may be environmentally compatible and in particular biodegradable, in order not to cause any environmental damage when the chemical system is used outdoors.

In transition region 28, thread 24 is completely covered by coating 30, so that anchor rod 10 has a smooth outer circumference in transition region 28, as can be seen in the enlargement of FIG. 2. Moreover, thread 24, which is equipped with coating 30, may have a cylindrical contour in transition region 28. Other contours are also conceivable, however, especially irregular contours, which are obtained by application of coating 30.

FIG. 3 illustrates anchor rod 10 in the form inserted to maximum setting depth $T_{max}$ in a borehole 18.

Borehole 18 was bored in a carrier 32, for example in concrete, and has a borehole bottom 34, a wall 36 and a borehole opening 38.

Anchor rod 10 is introduced so far into borehole 18 that the entire anchoring region 12 is located inside borehole 18. Transition region 28 together with parts of thread 24 is also introduced completely into borehole 18 and so is disposed in a portion 40 of borehole 18 that adjoins borehole opening 38. Borehole 18 is then filled completely with mortar compound 42.

On the part of connecting region 14 protruding from borehole 18, a mounting part 44, which is capable of carrying loads, for example, is fastened on anchor rod 10 by means of a nut 46.

Nut 46 has a female thread 48 complementary to thread 24 of connecting region 14, and has been screwed onto thread 24 from the rear end of anchor rod 10 in the direction of borehole 18.

In the entire borehole 18, anchor rod 10 is surrounded by mortar compound 42, which is bonded to wall 36 of borehole 18 and to anchoring region 12 of anchor rod 10, whereby anchor rod 10 is fastened securely in borehole 18.

However, mortar compound 42 is not bonded to anchor rod 10 in connecting region 14 or in transition region 28, since the material of the coating, in this case therefore the wax, is chosen such that it does not bond to mortar compound 42 or that it prevents mortar compound 42 from flowing into the thread.

In the enlargement of FIG. 3, it is apparent that mortar compound 42 has not penetrated into thread flights 26 in transition region 28, since coating 30 has effectively sealed thread flights 26. Accordingly, mortar compound 42 is in contact only with the smooth outer circumference in transition 28, and so mortar compound 42 and thus also wall 36 in portion 40 is exposed to only slight forces when anchor rod 10 is loaded. Thus thread 24 is not able to transmit any loads to regions of the cured mortar located outside it, and so simple activation of the expanding anchor rod can be achieved.

FIG. 4 illustrates a situation similar to that in FIG. 3. In the situation of FIG. 4, however, anchor rod 10 is fastened in carrier 32 only with minimum setting depth $T_{max}$.

In this situation, only anchoring region 12 is introduced into borehole 18 and surrounded by mortar compound 42. The entire connecting region 14, i.e. also the entire transition region 28, protrudes from borehole 18.

In FIG. 4, a mounting part 44 is also fastened with a nut 46 on anchor rod 10. In this case, nut 46 is located within transition region 28, which was originally equipped with coating 30.

When nut 46 was screwed on, the material of coating 30, and so in this case the wax, was removed or pressed out of thread flight 26 of thread 24 along transition region 28 by female thread 48 of nut 46, so that thread 24 was continuously uncovered. This can be seen in the enlargement of FIG. 4.

This wax was chosen such that it can be pressed out of thread flight 26 by nut 46.

In this way, it is possible, despite coating 30, to use thread 24 along its full length for fastening of mounting parts 44 or the like.

In order to utilize the full length of thread 24, nut 46 may also be screwed all the way to borehole opening 38 in a situation, not illustrated in FIG. 4, without mounting part 44, in other words to the point at which thread 24 ends.

The invention claimed is:

1. An anchor rod for a chemical anchor system for use in a borehole filled with a curable compound, said anchor rod comprising:
    an anchoring region that comprises a front end, and
    a connecting region adjacent to the anchoring region and comprising a thread, a coating, and a front end with a transition region, wherein the thread is provided at least partly in the transition region and is sealed with the coating in the transition region, and the coating includes a sealing compound that extends between turns of the thread surrounded by the curable compound and wherein:

the coating has a thickness greater than a height of the thread, the sealing compound of the coating includes a material that is partly removable to continuously uncover the thread when a female thread complementary to the thread turns coated portions of the thread, and the material that is partly removable comprises wax.

2. The anchor rod according to claim 1, wherein the coating completely fills and thereby seals the turns of the thread within the transition region.

3. The anchor rod according to claim 1, wherein the coating in the transition region has an outer contour that in an axial direction that is sufficient to reduce pull-out resistance.

4. The anchor rod according to claim 3, wherein the thread with the coating in the transition region has a cylindrical outer contour.

5. The anchor rod according to claim 1, wherein the coating has a smooth outer circumference in the transition region.

6. The anchor rod according to claim 1, wherein the transition region begins at a distance to the front end of the anchoring region that corresponds to a minimum setting depth (Tmin) of the anchor rod and the transition region extends in a direction away from the front end.

7. The anchor rod according to claim 1, wherein the anchor rod has a maximum setting depth (Tmax) which comprises the anchoring region and the transition region of the connecting region.

8. The anchor rod according to claim 1, wherein the sealing compound comprises a material that does not bond to curing compound.

9. The anchor rod according to claim 1, wherein the anchoring region has a fastening thread.

10. The anchor rod according to claim 9, wherein the fastening thread has conical portions.

11. The anchor rod according to claim 1, wherein in an installed state:

a first part of the sealing compound is removed from a first section of the thread, and a second part of the sealing compound remains in the thread, wherein the amount of the first part and an amount of the second part corresponds to an insertion depth of the anchor rod into the borehole.

12. The anchor rod according to claim 11, wherein the coating does not overlap the anchoring region.

* * * * *